United States Patent [19]

Mitani et al.

[11] 4,377,138
[45] Mar. 22, 1983

[54] GLOW PLUG CONTROL SYSTEM FOR DIESEL ENGINE

[75] Inventors: Tateki Mitani, Himeji; Akira Demizu, Tatsuno, both of Japan

[73] Assignee: Mitsubishi Denki Kabushiki Kaisha, Chiyodaku, Japan

[21] Appl. No.: 240,061

[22] Filed: Mar. 3, 1981

[30] Foreign Application Priority Data

Mar. 3, 1980 [JP] Japan .................... 55-28008[U]

[51] Int. Cl.³ .................................... F02N 17/00
[52] U.S. Cl. ..................... 123/179 H; 123/145 A; 123/179 B; 219/497
[58] Field of Search ........... 123/145 A, 179 H, 179 B, 123/179 R, 179 BG; 219/482, 492, 497

[56] References Cited

U.S. PATENT DOCUMENTS

| | | | |
|---|---|---|---|
| 3,789,190 | 1/1974 | Orosy et al. | 219/497 |
| 4,088,109 | 5/1978 | Woodruff et al. | 123/179 B |
| 4,195,415 | 4/1980 | Livings et al. | 219/497 |
| 4,283,619 | 8/1981 | Abe | 123/179 H |
| 4,307,688 | 12/1981 | Steele | 123/179 BG |

FOREIGN PATENT DOCUMENTS 54-159530  12/1979  Japan .................... 123/179 BG

*Primary Examiner*—P. S. Lall
*Attorney, Agent, or Firm*—Wenderoth, Lind & Ponack

[57] ABSTRACT

A glow plug control system which includes a controller connected to a battery through an ignition switch, an indicator lamp and a glow plug relay connected to the controller and a parallel combination of four glow plugs connected to the battery through normally open contacts of the relay. The controller includes a comparator having its two inputs connected across the parallel glow plugs, and a constant current circuit for supplying a constant current to the parallel combination of the glow plugs for sensing the resistance of the glow plugs. The controller senses the resistance of the glow plugs due to their temperature through the comparator and permits the battery to supply a current to the parallel combination of the glow plugs for a time determined in response to the sensed resistance.

2 Claims, 4 Drawing Figures

WATER TEMP ≤ 50°C

WATER TEMP > 50°C

GLOW PLUG CONTROL SYSTEM FOR DIESEL ENGINE

BACKGROUND OF THE INVENTION

The present invention relates to a glow plug control system for a Diesel engine used with a motor vehicle, and more particularly to such a system for controlling the temperature of a group of glow plugs.

A conventional glow plug control system of the type referred to has comprised a controller connected to a DC source such as a battery through an ignition switch including an OFF position, an ON position and an ST position where an associated Diesel engine is started, an indicator lamp, a first and a second glow plug relay connected to the controller and a parallel combination of glow plugs connected to the battery through the first glow plug relay and a sensing resistor and also through the second glow plug relay, a dropping resistor and the sensing resistor. With the ignition switch put in the ON position, the battery energizes the indicator lamp and the first glow plug relay through the controller to supply a current to the glow plugs through the first glow plug relay and sensing resistor, resulting in heating the glow plugs so as to be red hot. Then, the indicator lamp and the first glow plug relay are deenergized, whereupon the ignition switch is put in the ST position to start the Deisel engine and the indication lamp and the first and second glow plug relays are energized through the controller. Under these circumstances, the glow plugs gradually increase in temperature with a current passing through the first glow plugs relay and the sensing resistor. When the glow plugs reach the desired temperature, the first glow plug relay is automatically deenergized through the operation of the controller and the glow plugs receives a current only through the second glow plug relay. Upon the completion of the start of the Diesel engine, the ignition switch is returned back to the ON position and the second glow plug relay and the indicator lamp are deenergized.

Such a conventional glow plug control system has required a sensing resistor which is used exclusively to sense a magnitude of resistance due to a variation in temperature of the glow plugs. Furthermore, the glow plugs have received the current through both a current path with the dropping resistor and another current path without the latter and in a stepped manner. Therefore, the conventional control system has an increased number of structural components and has been complicated in its control. In addition, voltage drops across the two resistors or the dropping and sensing resistors have led to the disadvantage that such voltage drops have been the primary factor for which the temperature of the glow plugs is impeded from rising during the start of an associated Diesel engine. This is because the voltage drops act as power losses upon the battery, thereby decreasing its in capacity and reducing the voltage across the battery at low temperatures.

Accordingly, it is an object of the present invention to provide a new and improved glow plug control system which is inexpensive to manufacture and capable of rapidly heating a group of glow plugs by decreasing the power losses.

SUMMARY OF THE INVENTION

The present invention provides a glow plug control system comprising: a group of glow plugs; a selected one of either a constant current circuit and a constant voltage circuit for supplying a current to the group of glow plugs; a sensor means for sensing a magnitude of resistance of the glow plugs due to a change in temperature thereof; and a control means which is responsive to the magnitude of resistance sensed by the sensor means to control the time interval of conduction of the glow plugs, to thereby control the temperature thereof.

In a preferred embodiment of the present invention, the control means may include means responsive to a difference between a temperature of the group of glow plugs corresponding to the magnitude of resistance sensed by the sensor means and a reference temperature to control the time of conduction of the glow plugs.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
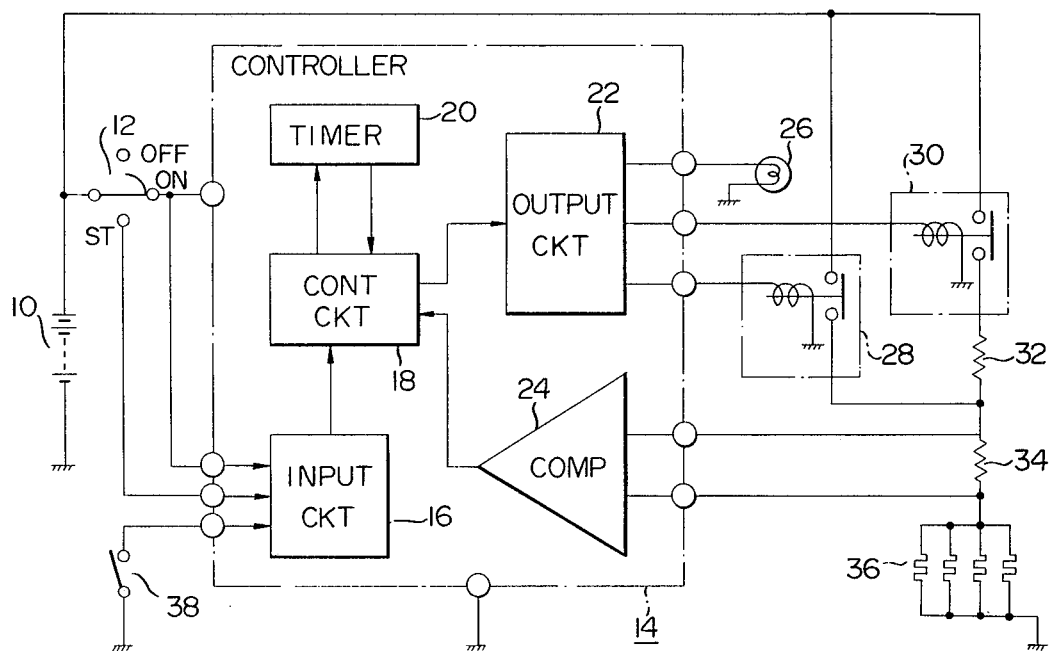
FIG. 1 is a combined block and circuit diagram of a conventional glow plug control system for Diesel engines.
Figure 2A:
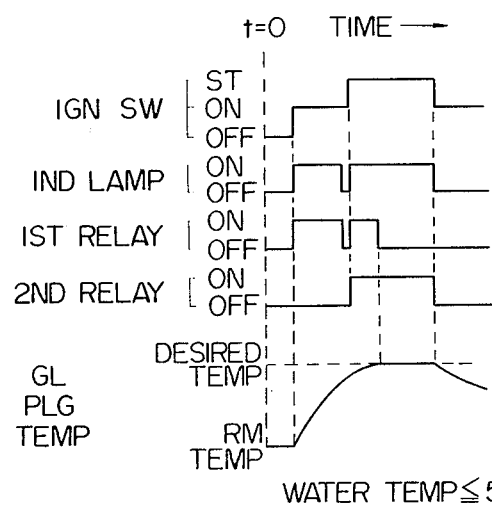
FIG. 2 is a graph illustrating waveforms developed at various points in the arrangement shown in FIG. 1.
Figure 2B:
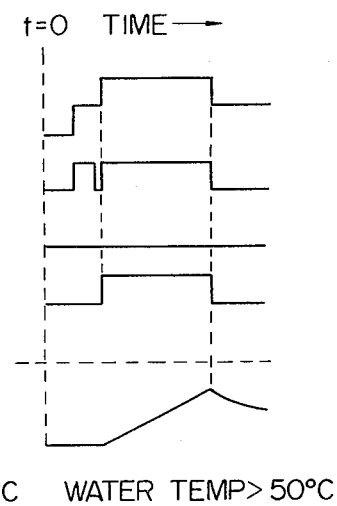

Referring now to FIG. 1 of the drawings, there is illustrated a conventional glow plug control system for the Diesel engine used with motor vehicles. The illustrated arrangement comprises a DC source 10, shown as a battery, which has one end or a negative end connected to ground; a normally open ignition switch 12, including a pair of stationary contacts or positions ON, which is ST and connected to a second or positive end of the DC source 10; and a controller, generally designated by the reference numeral 14, which is connected to the stationary contacts ON and ST of the ignition switch 12. In FIG. 2 the ignition switch 12 is shown as being placed in the ON position.

The controller 14 includes an input circuit 16 having three inputs, two of which are connected to the stationary contacts ON and ST of the ignition switch 12, a control circuit 18 connected to the input circuit 16, a timer 20 connected in two ways to the control circuit 18, an output circuit 22 connected to the control circuit 18, and a comparator 24 connected at the output to the control circuit 18.

The output circuit 22 includes three outputs, a first output connected to an indicator lamp 26 which is subsequently connected to ground, a second output connected to an operating winding of a first glow plug relay 28 and a third output connected to an operating winding of a second glow plug relay 30. Those glow plug relays 28 and 30 include respective normally open contact sets connected which are both to the second or positive end of the DC source 10.

The timer circuit 20 includes a first timer for controlling the conduction time of the first glow plug relay 28, a second timer for controlling the conduction time of the second glow plug relay 30 and a third timer for controlling the conduction time of the indicator lamp 26. The control circuit 18 is responsive to signals from the comparator 24, the input circuit 16 and the timer circuit 20 to control the operation of the output circuit 22 and is also responsive to the signals from the input circuit 16 and the comparator 24 to control the operation of the timer circuit 20.

The normally open contact set of the second glow plug relay 30 is connected in series with a dropping resistor while that of the first glow plug relay 28 is connected in series with a sensing resistor 34. The dropping resistor 32 is serially connected to the sensing resistor 34 which is, in turn, connected to ground through a group of glow plugs 36, in this case, four plugs connected in parallel. The resistor 34 is also connected across a pair of inputs to the comparator 24.

The input circuit 16 has the remaining input connected to a water temperature switch 38 for sensing a temperature of the cooling water for an associated Diesel engine (not shown). The water sensing switch 38 is shown in FIG. 1 as being in its open position and connected to ground.

The operation of the arrangement shown in FIG. 1 will now be described in conjunction with FIG. 2 wherein there are illustrated waveforms developed at various points in the arrangement on the lefthand and righthand portions labelled (a) and (b) respectively. In FIG. 2, the lefthand portion (a) illustrates waveforms developed when the temperature of the cooling water is not higher than 50° C. while the righthand portion (b) illustrates corresponding waveforms developed when that temperature is in excess of 50° C.

When the cooling water is at a temperature not higher than 50° C., the water temperature switch 38 is maintained in its open position. When the ignition switch 12 is put on its ON position or at an ON level as shown at the uppermost waveform labelled IGN SW on the lefthand portion (a) in FIG. 2, the indication lamp 26 is energized through the closed ignition switch 12 and the controller 14 from the DC source 10 (see waveform labelled IND LAMP, the lefthand portion (a), FIG. 2), and also the first glow plug relay 28 is similarly energized (see waveform labelled 1ST RELAY, the lefthand portion (a), FIG. 2). Therefore, the first glow plug relay 28 has its contact set in its closed position. This closure of the contact set causes a current from the DC source 10 to flow into the glow plugs 36 through the closed contact set and the sensing resistor 34 until the glow plugs 36 reaches their red hot state from room temperature as shown at the lowermost waveform GL PLG TEMP on the lefthand portion (a) in FIG. 2. This current flows through the glow plugs 36 only for a predetermined constant time interval.

Then, the indicator lamp 26 is deenergized while at the same time the first glow plug relay 28 is deenergized as shown waveforms IND LAMP and 1ST RELAY on the lefthand portion (a) in FIG. 2. Simultaneously with the deenergization of the indicator lamp 26, the ignition switch 12 is put in its position ST or at an ST level as shown at waveform labelled IGN SW on the lefthand portion (a) in FIG. 2. At the position ST the battery 10 is still connected to the stationary contact ST of the ignition switch 12 and an associated Diesel engine is started while the indicator lamp 26 and the first glow relay 28 are again energized (see waveforms IND LAMP and 1ST RELAY on the lefthand portion (a), FIG. 2). At the same time the second glow plug relay 32 is energized through the ignition switch 12 and the controller 14 from the DC source 10 (see waveform labelled 2ND RELAY, the lefthand portion (a), FIG. 2). Under these circumstances, the DC source 10 supplies a current to the parallel combination of the glow plugs 36 through the closed contact set of the first glow relay 28 and the sensing resistor 34. Therefore, the glow plugs 38 increase gradually in temperature until they reach the desired temperature (see waveform GL PLG TEMP, the lefthand portion (a), FIG. 2). At that time the first glow plug relay 28 is automatically deenergized through the operation of the controller 14 (see waveform 1ST RELAY, the lefthand portion (a), FIG. 2) after which parallel combination of the glow plugs 36 receive the current through the second glow plug relay 30, and resistors 32 and 34.

Then, the engine (not shown) starting is completed, to be whereupon the ignition switch 12 is returned back to its ON position and simultaneously the second glow plug relay 30 and the indicator lamp 26 are deenergized as shown at waveforms IGN SW, IND LAMP and 2ND RELAY on the lefthand portion (a), in FIG. 2.

When the water temperature is in excess of 50° C., the water temperature switch 38 is in its closed position and the operation of the arrangement is substantially identical to that described above in conjunction with the water temperature less than 50° C. excepting that the indicator lamp 26 has a short energized time interval and that the first glow plug relay 28 is maintained inoperative as will readily be understood from the corresponding waveforms illustrated on the righthand portion (b) in FIG. 2. It is noted that the glow plugs 36 are supplied with current only through the second glow plug relay 30 and the resistors 32 and 34.

In the arrangement of FIG. 1, it has been necessary to provide the sensing resistor 34 which is used exclusively for the purposes of sensing the magnitude of the resistance of the glow plugs due to a change in the temperature thereof. Furthermore, the parallel combination of glow plugs 36 is supplied with a current through a current path with the dropping resistor 32 and that without the latter and also in a stepped manner. This has resulted in both an increase in the number of components and a complicated control. In addition, the arrangement of FIG. 1 has been disadvantageous in that voltage drops across two resistors i.e.—the dropping and sensing resistors 32 and 34, are the primary factor for preventing the temperature of the glow plugs 36 from rising during the start of the associated Diesel engine. This is because such voltage drops act as power losses upon the battery, thereby reducing its capacity and decreasing the voltage across the battery 10 at low temperatures.

Figure 3:
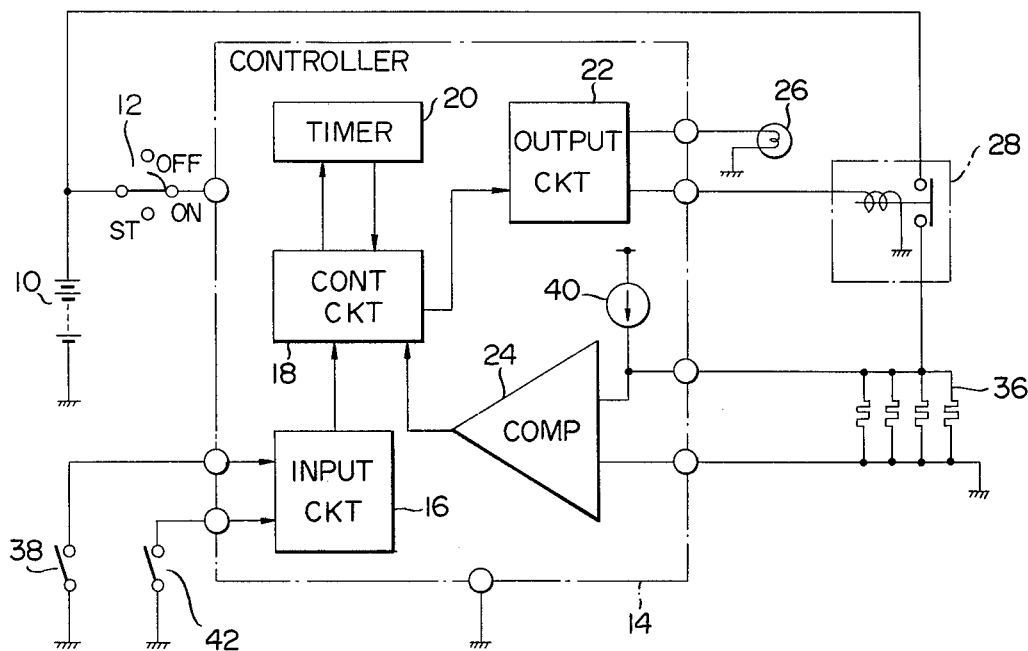
FIG. 3 is a combined block and circuit diagram of one embodiment according to the glow plug control system of the present invention.

Referring now to FIG. 3, wherein like reference numerals designate the components identical to those shown in FIG. 1, there is illustrated one embodiment according to the glow plug control system of the present invention. In the illustrated arrangement, the pair of inputs to comparator 24 are connected across the parallel combination of glow plugs 36 and a constant current circuit 40 is disposed in the controller 14 to be connected to those ends of the glow plugs 36 remote from ground. Furthermore, the glow plug relay 28 includes the normally open contact set connected directly to the parallel combination of glow plugs 36 with the omission of the second glow plug relay 30, and the dropping and sensing resistors 32 and 34, respectively.

The input circuit 16 in the controller 14 does not include an input connected to the stationary contact ST of the ignition switch 12 but includes an additional input connected to a regulation switch 42 for an associated electric generator (not shown) which is subsequently connected to ground. Therefore, the stationary contact ST is not connected to the input circuit 16. That switch 42 is shown in FIG. 3 as being in its open position and is arranged to be closed in response to the sensing of the start of the associated Diesel engine (not shown).

In other respects the arrangement is identical to that shown in FIG. 1.

Figure 4:
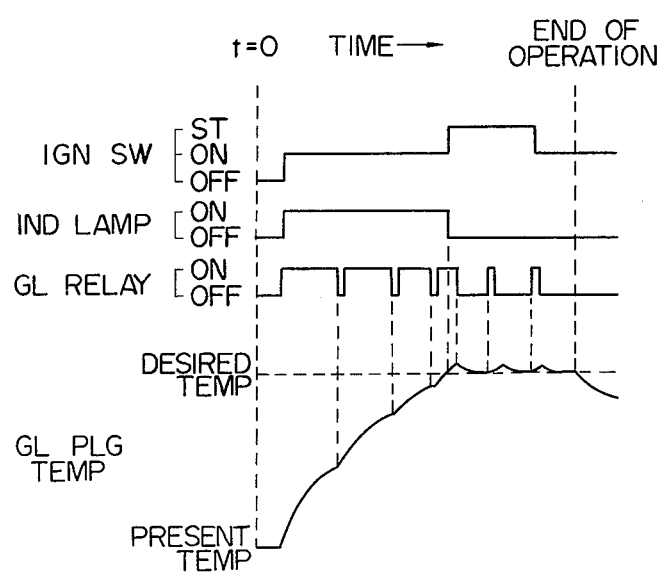
FIG. 4 is a graph illustrating waveforms developed at various points in the arrangement shown in FIG. 3.

The operation of the arrangement shown in FIG. 3 will now be described in conjunction with FIG. 4 wherein there are illustrated waveforms developed at various points in the arrangement. In FIG. 4, like reference characters designate waveforms corresponding to those shown in FIG. 2 except for waveform GL RELAY developed on the glow plug relay 28 shown in FIG. 3.

With the ignition switch 12 in its ON position, the constant current circuit 40 supplies a constant current to the parallel combination of glow plugs 36 while the comparator 24 senses a magnitude of resistance of the glow plugs 36 due to a change in temperature thereof to thereby determine a time of conduction of the glow plug relay 28. That time of conduction is determined to be proportional to the difference between the desired temperature and the measured temperature of glow plugs at that time.

Then, the time of conduction is set in the timer 20. The constant current circuit then ceases to supply the constant current to the glow plugs 36. Furthermore, indicator lamp 26 is energized through the controller 14 from the DC source 10 and the glow plug relay 28 is maintained energized for the time of conduction set in the timer 20 (see waveforms IND LAMP and GL RELAY, FIG. 4). Meanwhile, a current from the DC source 10 flows into the parallel combination of glow plugs 36 through the closed contact set of the glow relay 28 to put the glow plugs 36 in their red hot state.

The timing out of the timer 20 terminates the flow of current through the parallel combination of the glow plugs 36, and the constant current circuit 40 again supplies the constant current to the parallel combination of the glow plugs 36 while the comparator 24 senses the magnitude of the resistance thereof in order to measure the temperature thereof.

If the glow plugs 36 do not reach the desired temperature, as determined by the comparator 24, then the controller 14 is operated to cause the glow plugs 36 to be heated red hot for a time interval proportional to the difference between the desired and measured temperature through the energization of the glow plug relay 28.

The process as described above is repeated to intermittently continue the flow of the current through the parallel combination of glow plugs 36, as shown at waveform GL RELAY in FIG. 4, until the glow plugs 36 reach the desired temperature, as shown at waveform GL PLG in FIG. 4. At that time, the indicator lamp 26 is deenergized, as shown at waveform IND LAMP in FIG. 4, and the ignition switch 12 is simultaneously put in its position ST to start the Diesel engine (not shown).

Under these circumstances, the comparator 24 continues to sense the magnitude of resistance of the glow plugs 36 until the temperature of the glow plugs 36 falls below the desired temperature. At that time, the glow plugs 36 are again heated red hot as described above. Since the measured temperature in this stage is only minutely different from the desired temperature, the time interval set in the timer 20 is short enough to maintain the glow plugs 36 at the desired temperature as will readily understood from the waveforms GL RELAY and GL PLG shown in FIG. 4.

Thereafter, the engine is completely started and the temperature control as described above continues to be effected until the water for cooling the engine reaches a predetermined constant temperature.

Under these circumstances, the regulation switch 42 senses the complete explosion occurring in the engine and the water temperature switch 38 sense the temperature of the cooling water.

The arrangement of FIG. 4 can function to sense the break of any one or ones of the glow plugs 36. It is now assumed that a single one of the glow plugs 36 has been broken only for purpose of simplifying the description. On the assumed conditions, all of the sound glow plugs 36 have the resultant magnitude of resistance decreased by a magnitude of resistance corresponding to the single glow plug as compared with that of all the glow plugs maintained sound. Therefore, the temperature of the glow plugs rise within a short time interval as compared with that of all the glow plugs maintained sound so that the sound glow plugs reach the desired temperature fast. As a result, the indicator lamp 26 is deenergized more quickly than that operated in the normal mode which indicates the break of the glow plug. However, it is to be understood that the temperature control is effected in the normal mode and that the remaining sound glow plugs are enabled to start the associated Diesel engine.

From the foregoing it is seen that the present invention provides a glow plug control system arranged to use a constant current to sense a magnitude of resistance of a glow plug group involved due to a change in temperature thereof. Therefore, the glow plug control system makes it possible to perform an operation which is substantially identical to that performed by the prior art practice but still decreasing the number of the components and using inexpensive components and omitting the second glow plug relay 30, the dropping resistor 32 and the sensing resistor 34. Furthermore, the glow plugs can be rapidly heated.

While the present invention has been illustrated and described in conjunction with a single preferred embodiment thereof it is to be understood that numerous changes and modifications may be resorted to without departing from the spirit and scope of the present invention. For example, a constant voltage circuit may be substituted for the constant current circuit with a satisfactory result. Furthermore, the present invention may be effectively used to stably control the operation of a Diesel engine involved after its start.

What is claimed is:

1. A glow plug control system comprising a group of glow plugs, a timer means, a constant current circuit and a constant voltage circuit for supplying a current to said group of glow plugs, said constant current circuit and said constant voltage circuit controlled by said timer, a sensor means for sensing a magnitude of resistance of said glow plugs due to a change in temperature thereof, and a control means responsive to said magnitude of resistance sensed by said sensor circuit to control a time interval of heating said glow plugs to thereby control temperature thereof, wherein said timer means selectively causes only one of said constant current circuit and said constant voltage circuit to supply current to said group of glow plugs at any time instant.

2. A glow plug control system as claimed in claim 1, wherein said control means includes means responsive to a difference between a temperature of said glow plugs corresponding to said magnitude of resistance sensed by said sensor means and the desired temperature to control said time interval of heating of said glow plugs.

* * * * *